United States Patent
Lee et al.

(10) Patent No.: US 9,189,802 B2
(45) Date of Patent: Nov. 17, 2015

(54) METHOD FOR CONTENTS RECOMMENDATION

(75) Inventors: Kibeom Lee, Suwon-si (KR); Kyogu Lee, Suwon-si (KR)

(73) Assignee: SEOUL NATIONAL UNIVERSITY R&DB FOUNDATION, Seoul (KR)

(*) Notice: Subject to any disclaimer, the term of this patent is extended or adjusted under 35 U.S.C. 154(b) by 589 days.

(21) Appl. No.: 13/593,444

(22) Filed: Aug. 23, 2012

(65) Prior Publication Data
US 2014/0059128 A1    Feb. 27, 2014

(51) Int. Cl.
| G06F 15/16 | (2006.01) |
| G06Q 30/02 | (2012.01) |
| G06Q 30/06 | (2012.01) |
| G06Q 30/00 | (2012.01) |

(52) U.S. Cl.
CPC ........ G06Q 30/0207 (2013.01); G06Q 30/0241 (2013.01); G06Q 30/0278 (2013.01); G06Q 30/0631 (2013.01); G06Q 30/00 (2013.01)

(58) Field of Classification Search
None
See application file for complete search history.

(56) References Cited

U.S. PATENT DOCUMENTS

| 7,054,921 | B2 * | 5/2006 | DeMartin | ................. | G09B 7/04 707/E17.111 |
| 2008/0104111 | A1 * | 5/2008 | Slaney | ............... | G06F 17/30017 1/1 |
| 2009/0056525 | A1 * | 3/2009 | Oppenheimber | . | G06F 17/30743 84/609 |
| 2009/0217804 | A1 * | 9/2009 | Lu | ......................... | G10H 1/0058 84/602 |
| 2010/0070917 | A1 * | 3/2010 | Gates | ................ | G06F 17/30053 715/810 |
| 2010/0198767 | A1 * | 8/2010 | Farrelly | ................ | H04L 67/306 706/46 |
| 2010/0198944 | A1 * | 8/2010 | Ho | ........................ | H04L 12/189 709/217 |
| 2011/0060738 | A1 * | 3/2011 | Gates | ................ | G06F 17/30749 707/737 |
| 2011/0208831 | A1 * | 8/2011 | Ho | ........................ | H04L 12/189 709/217 |
| 2014/0031961 | A1 * | 1/2014 | Wansley | ........... | G06F 17/30766 700/94 |

OTHER PUBLICATIONS

IDS submitted NPL: Music Recommendation in the Personal Long Tail, by Kibeom Lee, Woo Yeo and Kyogu Lee; 2010.*
C. Anderson. The Long Tail: Why the Future of Business Is Selling Less of More. Hyperion, 2006.
E. Brynjolfsson, Y. J. Hu, and D. Simester. Goodbye pareto principle, hello long tail: The effect of search costs on the concentration of product sales. Technical report, Massachusetts Institute of Technology (MIT)—Sloan School of Management; National Bureau of Economic Research (NBER), Purdue University—Krannert School of Management, MIT Sloan School of Management, 2007.

(Continued)

*Primary Examiner* — Viet Vu
*Assistant Examiner* — James Edwards
(74) *Attorney, Agent, or Firm* — John K. Park; Park Law Firm

(57) ABSTRACT

A method for music recommendation is provided using collaborative filtering methods while still managing to produce novel yet relevant items and by utilizing the long-tailed distribution of listening behavior of users, in which their playlists are biased towards a few songs while the rest of the songs, those in the long tail, have relatively low play counts. Also a link analysis method is applied to users with links between them to create an increasingly fine-grained approach in calculating weights for the recommended items. Results show that the method manages to include novel recommendations that are still relevant, and shows the potential for a new way of generating novel recommendations.

13 Claims, 6 Drawing Sheets

(56) References Cited

OTHER PUBLICATIONS

O. Celma. Foafing the music: Bridging the semantic gap in music recommendation. In Proceedings of the 5th International Semantic Web Conference, pp. 927-934. Springer, 2006.

O. Celma and P. Lamere. If you like the beatles you might like . . . : A tutorial on music recommendation. In A. El-Saddik, S. Vuong, C. Griwodz, A. D. Bimbo, K. S. Candan, and A. Jaimes, editors, ACM Multimedia, pp. 1157-1158. ACM, 2008.

Y.-C. Chen, R.-A. Shang, and C.-Y. Kao. The effects of information overload on consumers' subjective state towards buying decision in the internet shopping environment. Electron. Commer. Rec. Appl., 8:48-58, Jan. 2009.

D. Goldberg, D. Nichols, B. M. Oki, and D. Terry. Using collaborative filtering to weave an information tapestry. Commun. ACM, 35(12):61-70, 1992.

J. L. Herlocker, J. A. Konstan, and J. T. Riedl. Evaluating collaborative filtering recommendations. In Computer Supported Cooperative Work, pp. 241-250, 2000.

W. Hill, L. Stead, M. Rosenstein, and G. Furnas. Recommending and evaluating choices in a virtual community of use. In CHI '95: Proceedings of the SIGCHI conference on Human factors in computing systems, pp. 194-201, New York, NY, USA, 1995.

Z. Huang, D. Zeng, and H. Chen. A link analysis approach to recommendation under sparse data. In Proceedings of the Tenth Americas Conference on Information Systems, New York, NY, USA, 2004.

J. A. Konstan, B. N. Miller, D. Maltz, J. L. Herlocker, L. R. Gordon, and J. Riedl. GroupLens: applying collaborative filtering to Usenet news. Communications of the ACM, 40(3):77-87, 1997.

K. Lee, W. S. Yea, and K. Lee. Music recommendation in the personal long tail: Using a social-based analysis of a user's long-tailed listening behavior. In Proceedings of the Workshop on Music Recommendation and Discovery, pp. 47-54, 2010.

M. Levy and M. Sandler. A semantic space for music derived from social tags. In Proceedings of the 8th International Conference on Music Information Retrieval, Vienna, Austria, 2007.

G. Linden, B. Smith, and J. York. Amazon.com recommendations: Item-to-item collaborative filtering. IEEE Internet Computing, 7(1):76-80, Jan. 2003.

L. Page, S. Brin, R. Motwani, and T. Winograd. The pagerank citation ranking: Bringing order to the web. Technical Report 1999-66, Stanford InfoLab, Nov. 1999. Previous No. = SIDL-WP-1999-0120.

P. Resnick, N. Iacovou, M. Suchak, P. Bergstrom, and J. Riedl. Grouplens: An open architecture for collaborative filtering of netnews. In Proceedings of ACM 1994 Conference on Computer Supported Cooperative Work, pp. 175-186. ACM Press, 1994.

B. M. Sarwar, G. Karypis, J. A. Konstan, and J. Riedl. Analysis of recommendation algorithms for e-commerce. In Proceedings of the Second ACM Conference on Electronic Commerce (EC'00), pp. 285-295, 2000.

J. B. Schafer, D. Frankowski, J. Herlocker, and S. Sen. Collaborative filtering recommender systems, 2007.

U. Shardanand and P. Maes. Social information filtering: algorithms for automating "word of mouth". In CHI '95: Proceedings of the SIGCHI conference on Human factors in computing systems, pp. 210-217, New York, NY, USA, 1995. ACM Press/Addison-Wesley Pubishing Co.

\* cited by examiner

| | | | |
|---|---|---|---|
| 430 | | Tyvek - 4312 | 4 |
| 430 | ▶ | Calvin Johnson - Your Eyes | ♥ 4 |
| 430 | | The Monochrome Set - I don't know | 4 |
| 430 | | King Tuff - A Pretty Dress | 4 |
| 430 | ▶ | Chuck Berry - Oh Baby Doll (1957 Single Version) | 4 |
| 430 | ▶ | Billie Davis - I'm In Love With You | 4 |
| 430 | ▶ | Billie Davis - It's Over | 4 |
| 430 | | Billie Davis - He's the One [*] | 4 |
| 430 | | Billie Davis - V.I.P. [*] | 4 |
| 430 | | King Tuff - Sun Medallion | 4 |
| 430 | ▶ | The Growlers - No Trees in the Desert | 4 |
| 430 | | Adam Green - Tropical Island | ♥ 4 |
| 430 | ▶ | for ex-lovers only - Coffin | 4 |
| 430 | | The Brunettes - Too Much Coffee | 4 |
| 430 | ▶ | Crystal Stilts - Through the Floor | 4 |
| 430 | ▶ | The Pains of Being Pure at Heart - Ramona | 4 |
| 430 | | Planet Earth - Big Babies | 4 |
| 430 | ▶ | Younger Lovers - Kiss Me On The Bus | 4 |

Fig. 2

Music Recommender

Your songs   What's this?

Hi GusAbreu!

Below are songs that you marked 'loved' but didn't listen to much. Your recommendations will be generated by our algorithm using these songs.

- ♥ The Sound Of Silence - Simon & Garfunkel
- ♥ Free Bird - Lynyrd Skynyrd
- ♥ Deeper Down - My Dying Bride
- ♥ What's My Age Again? - blink-182
- ♥ More Than Words - Extreme
- ♥ Samson - Regina Spektor
- ♥ I Miss You - blink-182
- ♥ Closer - Travis
- ♥ Wind Of Change - Scorpions
- ♥ Creep (Acoustic) - Radiohead
- ♥ Teflon - The Mars Volta
- ♥ Faroeste Caboclo - Legião Urbana
- ♥ Vento No Litoral - Legião Urbana
- ♥ Tempo Perdido - Legião Urbana
- ♥ Angels Walk Among Us - Anathema
- ♥ Gone With The Sin - HIM
- ♥ Preciso Me Encontrar - Cartola
- ♥ Pais E Filhos - Legião Urbana
- ♥ Quiet World - Katatonia
- ♥ One Last Goodbye - Anneke van Giersbergen & Danny Cavanagh
- ♥ How Deep Is Your Love? - Bee Gees ...and here are your recommendations!

[Evaluation]
If you like the song, check 'relevant' to mark yes!
If you haven't heard the song before, check 'novel' to mark yes!

You can check out the songs through the 'Play on Hype Machine link' on the song's last.fm page.

Contact me at kiblee /at/ snu.ac.kr for any questions and/or feedback!

( Submit evaluation )

| Rank | Title | Artist | Relevant? | Novel? |
|---|---|---|---|---|
| 1 | Hide and Seek | Imogen Heap | ○Y ○N | ○Y ○N |
| 2 | Skinny Love | Bon Iver | ○Y ○N | ○Y ○N |
| 3 | Heartbeats | José González | ○Y ○N | ○Y ○N |
| 4 | Such Great Heights | The Postal Service | ○Y ○N | ○Y ○N |
| 5 | I Will Follow You Into the Dark | Death Cab for Cutie | ○Y ○N | ○Y ○N |
| 6 | Hoppípolla | Sigur Rós | ○Y ○N | ○Y ○N |

Fig. 5

METHOD FOR CONTENTS RECOMMENDATION

BACKGROUND OF THE INVENTION

Up until the rapid development of the Internet and the evermore increasing number of connected users, only a few best-selling products had been prevalent in various markets. This was a natural occurrence due to the limited physical space available in the stores, in which it is sensible to stock popular items. The music market was no exception: retail stores focused their sales on popular albums from the Top 100 Billboard charts. As Brynjolfsson et al. correctly predicted, product sales would be less and less concentrated, the power of balance shifting from the few best-selling products to niche products that were previously difficult for consumers to discover [2].

Indeed, with the arrival of broadband connections, lower hardware costs, and popularity of high-storage media players, the online industry has grown rapidly in the recent years. Online music stores now offer songs to users ranging in the millions, the largest online stores currently offering over 14 million songs. This availability of non-popular items creates a niche market that, collectively, could rival or exceed sales of popular items, known as the Long Tail [1].

This Long Tail business model provides consumers with millions of items to choose from, something that was not possible with retail outlets. However, offering too many choices created a problem of information overload in which, paradoxically, "consumers were less satisfied, less confident, and more confused" [5]. The solution to information overload was recommendation systems, which would ultimately filter out unnecessary items and provide only those that were relevant to the user. Among the various kinds of recommendation systems, collaborative filtering is the most successful method and most widely used in commercial services [16]. This is because collaborative filtering can be applied independent of its domain, relatively easier to implement compared to content-based and hybrid algorithms, and provides the most relevant results to users.

SUMMARY OF THE INVENTION

The present invention contrives to solve the disadvantages of the prior art.

An object of the invention is to provide a method for contents recommendation.

An aspect of the invention provides a method for contents recommendation comprising steps for:

providing a plurality of playlist's distributions associated with a plurality of users respectively;

selecting a novice user from the plurality of users, wherein the novice user has one or more novice-loved-contents in a long tail of an associated playlist's distribution as a novice-playlist's distribution;

finding a first expert user with an associated playlist's distribution as a first-expert-playlist's distribution, wherein a short head of the first-expert-playlist's distribution includes at least one of the novice-loved-contents;

finding a second expert user with an associated playlist's distribution as a second-expert-playlist's distribution, wherein a short head of the second-expert-playlist's distribution includes at least one of the novice-loved-contents;

finding a third expert user with an associated playlist's distribution as a third-expert-playlist's distribution, wherein a short head of the third-expert-playlist's distribution includes at least one of the novice-loved-contents;

assigning a weight for each of contents in the short head of each of the experts, wherein the weight depends on a sum of importances of the experts for the specific contents, wherein an importance of an expert is determined by a number of identical contents between the expert's playlist and each of the other expert's playlist and a number of identical loved-contents between the expert's playlist and each of the other expert's playlist; and recommending a first N highly-weighted contents to the novice user.

A playlist distribution may include contents's information, play counts, and preference tags.

Each of the loved-contents may be selected and marked 'a loved-contents' in the preference tag by corresponding user, and the other contents in a playlist may be marked 'regular-contents'.

The playlist's distributions may be associated with a threshold number, top-count contents of which dividing the short head from the long tail of distribution.

The method may further comprise a step for discarding a recommended contents if an artist of the recommended contents is already known in the playlist of the novice.

The contents may be songs, and the importance of an expert, $E_j$, may be given by $$Imp(E_j) = Ind(E_j) + \sum_{i=1}^{N_{exp}} \frac{RegSongs(E_j, E_i) * Imp(E_i)}{N_{loved} + 1 - LovedSongs(E_j, E_i)}, i \neq j,$$

where $Ind(E_j)$ is the independent weight of the expert, $N_{exp}$ is the number of total experts, $RegSongs(E_j, E_i)$ denotes the number of same song occurrences in the playlists of experts $E_i$ and $E_j$, $N_{loved}$ is the total number of 'loved' songs in the novice's long tail, and $LovedSongs(U_j, U_i)$ denotes the number of 'loved' songs that both experts share.

The independent weight, $Ind(E_j)$, may be a basic weight that an expert is assigned to.

The independent weight may be set to a number of 'loved' songs that the expert possessed.

In the step for assigning a weight, the short head portion may be used for the expert's playlist and the long tail portion may be used for the novice's playlist.

The step of assigning a weight may comprise a step for assigning a high score to a contents that belongs to an expert with a high importance.

Each of the plurality of playlist's distributions may be sorted by play count defining play count distribution as a function of song index.

The contents may comprise songs, movies, books, and on-line shopping items.

The threshold number may be determined by the number of entire users.

The threshold number may comprise 5, 10, 20, 30, 40, 50, 100, 200, 400, 800, and 1600.

The method may further comprise a step for finding more than the three experts from the users, each with an associated playlist's distribution as an specific expert-playlist's distribution, wherein a short head of the specific expert-playlist's distribution includes at least one of the novice-loved-contents. The more users, then the more experts may be.

The advantages of the present invention are: (1) the popularity bias can be overcome in contents recommendation; and (2) the relative importance or weight can be assigned a decimal number.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 2 shows a portion of the long tail of a user's playlist on Last.fm, in which although two songs have been marked 'loved', the user has only listened to them four times;

FIG. 5 shows a screenshot of the recommendation page from the live test, in which the user is shown his/her 'loved' songs and the recommendations that are generated using those songs.

DETAILED DESCRIPTION EMBODIMENTS OF THE INVENTION

Figure 1:
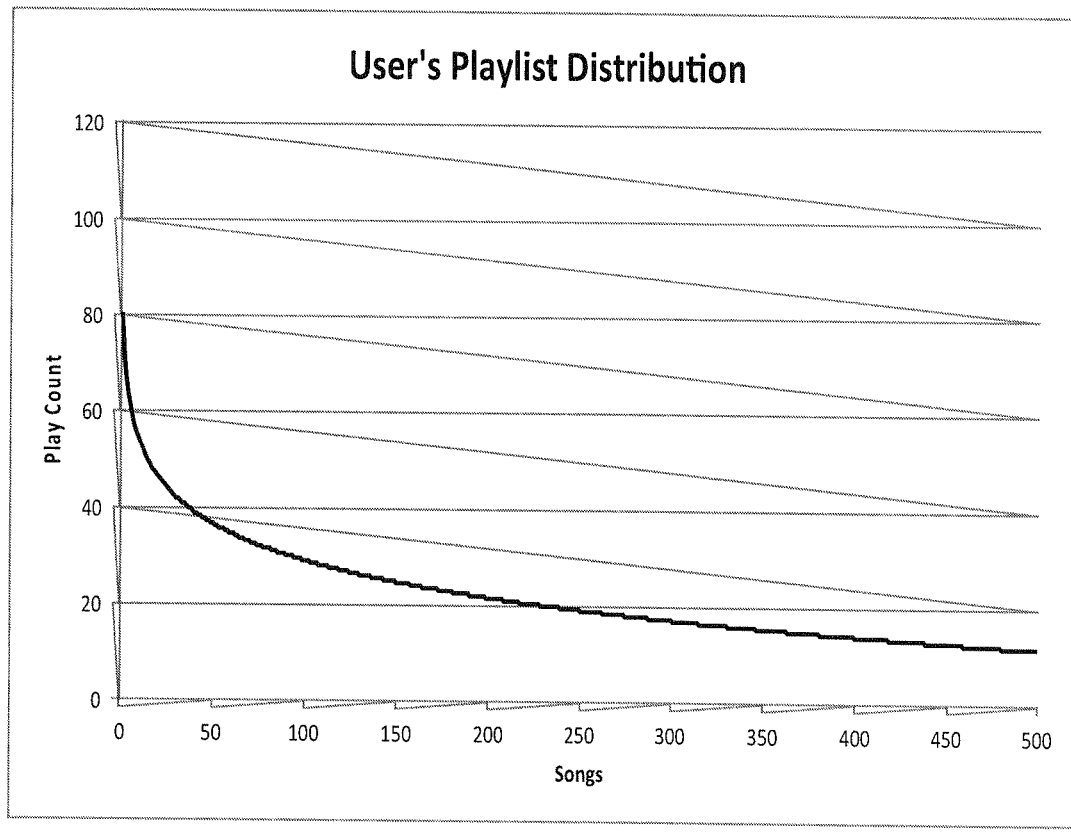
FIG. 1 shows a typical user's listening behavior, in which heavy listening is concentrated on a small group of songs, while the remaining songs have a relatively small count.

Collaborative filtering, being a popular method for generating recommendations, produces satisfying results for users by providing extremely relevant items. Despite being popular, however, this method is prone to many problems. One of these problems is popularity bias, in which the system becomes skewed towards items that are popular amongst the general user population. These 'obvious' items are, technically, extremely relevant items but fail to be novel. In the invention, we maintain using collaborative filtering methods while still managing to produce novel yet relevant items. This is achieved by utilizing the long-tailed distribution of listening behavior of users, in which their playlists are biased towards a few songs while the rest of the songs, those in the long tail, have relatively low play counts. In addition, we also apply a link analysis method to users and define links between them to create an increasingly fine-grained approach in calculating weights for the recommended items. The proposed recommendation method was available online as a user study in order to measure the relevancy and novelty of the recommended items. Results show that the algorithm manages to include novel recommendations that are still relevant, and shows the potential for a new way of generating novel recommendations.

Collaborative Filtering-Based Recommender Systems

Tapestry was one of the first recommender systems that was based on collaborative filtering [6]. It was designed to solve the problem of the ever-increasing flow of emails and filter out irrelevant emails and deliver the rest to the user. It used the opinions of relatively small-groups, such as office workgroups, to filter the emails. However, Tapestry was limited to working in small networks because the users had to be familiar with the preferences and opinions of other users.

Resnick et al. developed a method of collaborative filtering, in which the objective was to find relevant news articles for each user, called GroupLens [15, 10]. The key concept of this method was that "people who agreed in the past will probably agree again." This key concept enabled the system to predict the ratings of news articles by a certain user. A crucial difference of GroupLens compared to Tapestry is that the users did not need any knowledge on the preferences of other users, since the system was responsible for finding similar users based on the ratings they gave to the news articles.

Another recommendation system, named Ringo, was developed with a goal to provide music recommendations that were customized for each user [18]. The system utilized the ratings that the user assigned to artists, which was an explicit way of expressing whether the user liked or disliked that particular artist. The system then analyzed the different users' rating profiles to generate recommendations that had a high probability of being highly rated by the user.

Bellcore's recommender system was extremely similar to Ringo, except that the target items were movies instead of music [8]. Like Ringo, Bellcore's system used item ratings given by each user to match users whose profiles were similar. Similar profiles were defined as those whose ratings were similar for the same items.

Despite the many collaborative filtering algorithms to date, the most well known system is most likely the one used by Amazon.com, one of the largest electronic commerce companies. Contrary to the methods used in the studies above, Amazon.com analyzes item similarities instead of user similarities. Thus, when a user purchases an item, the system recommends items that seem to be similar to the purchased one. The advantage of such a method, called item-to-item collaborative filtering, is that it is scalable to enormous datasets and at the same time produces satisfying results to the user [13].

Collaborative Filtering-Based Recommender Systems for Music

The above methods could be easily applied to music recommendation, as music can, and currently is, rated by users. However, music has a uniquely abundant amount of metadata associated with it, which can be utilized to produce recommendations.

Celma et al. discusses the different types of metadata that are available for recommendation systems to use. These metadata range from reviews, blogs, bios, to lyrics, tags, and playlists [4].

Celma also introduces a system that uses the Friend of a Friend and RSS vocabularies to create recommendations [3]. Through these vocabularies, the system is able to analyze the user's musical tastes and listening habits. Results show that Celma's recommender system improves existing systems through taking in consideration the user's psychological factors, such as demographic preference, socioeconomics, social relationships, etc, and music preferences.

One of the most popular metadata to be used for recommendation are tags. Levy and Sandler approach tags by treating them as a source of semantic metadata for music [12]. Their study finds that at the track level, these tags are extremely well defined and abundant. They then propose an interface that can be used to browse music by mood through representing musical emotion in a two-dimensional space.

Lee et al. used both implicit (play count) and explicit (marking a song 'loved') user feedback to ultimately generate recommendations [11]. The play count information was used as an indirect method to define the expertise in the music that the users listened to the most, labeling such users as experts. By observing that music playlists had a long-tailed distribution, with only a select items having relatively high play counts compared to the rest of the songs and a vast number of songs having a play count of one or even zero, users would be defined as experts on songs in their short head and novices on songs in their long tail. Experts of a set of query songs were then gathered and analyzed for similarity to provide recommendations that were novel but remained relevant. However, the method that was used to calculate the priorities of recommended songs naturally led to results having the same weights, since they were integers. This made it impossible to distinguish between songs that were jointly second or third priority, which prevents the algorithm from being able to generate a Top N recommendation list. In the invention, we propose a refined algorithm that assigns detailed weights to songs, allowing to generate a final Top N list of recommendations. In addition, the proposed algorithm produces a high percentage of novel and relevant items.

Link Analysis on Collaborative Filtering

Huang et al. uses a link analysis approach to complement collaborative filtering algorithms in order to solve the sparsity problem [9]. They represented customers and products as nodes and formed a bipartite graph with edges representing transactions. A recommendation algorithm based on link analysis similar to those used in Web graph analysis was applied to an online bookstore database. The algorithm was able to outperform other algorithms, particularly when the sparsity problem was existent.

First, we go over the background of the algorithm before dwelling on the algorithm in depth. We discuss some observations of the patterns of users' music listening behaviors; provide a differing perspective on what a novel recommendation is, and point out users' particular puzzling behavior, which all lay the foundation needed to explain the key concept of the algorithm.

The observations and data used for the algorithm were collected from Last.fm, a commercial music streaming service. Last.fm provides an API to collect data that ranges from user information, playlist information to artist and song information. It is also a good starting point for studies because of the popularity of the service and its massive amount of data and users.

Long-Tailed Listening Behavior

The general population of music listeners who have a substantial amount of songs in their playlist tend to listen to a small subset of their songs heavily and rarely listen to the rest. A typical graph of a user's playlist is shown in FIG. 1, which is a random user's playlist selected from Last.fm. This kind of behavior can also be seen in personal music players, in which one study analyzed 5,000 iPod users and found that 23% of songs accounted for 80% of the plays. The remaining 64% of songs were never played [4]!

As can be seen in the figure, the listening behavior shows a long-tailed distribution. Keep in mind that it only shows the top 500 songs from the user's playlist, which is the maximum number of songs that are openly available. The graph would show an even more skewed distribution if the entire playlist was available, taking into account songs that even have play counts of only one.

Rethinking Novel Recommendations

Recommender systems, whether using collaborative filtering, content-based analysis, or a hybrid method, have the same objective in general: generating recommendations that are both relevant and novel. However, collaborative filtering, due to its nature of the algorithm, is prone to popularity bias. This makes it difficult for algorithms based on collaborative filtering to produce novel recommendations.

To solve this problem, content-based recommender systems can be used. Such systems provide more relevant results compared to collaborative filtering because the contents are being analyzed, without the influence of the popularity of the item, or any other external social influence. A much simpler approach, regardless of the method being used, would be to generate the recommendations and then filter out popular artists. This way, the remaining set of recommendations would consist of artists that reside in the long tail, i.e. less popular artists [4].

The above method is indeed a method to produce novel recommendations, where 'novel' is defined as something that is new to the user. Selecting artists that reside in the long tail would, of course, have a high probability of being novel to almost every user.

However, there is no need to discard popular recommendations because what is 'novel' is relative to each user. To illustrate this, let there be a casual music lover who enjoys listening to rock music, but occasionally listens to some reggae. Her main domain of music would be rock music, which she would be knowledgeable in. In this case, traditional recommender systems would have trouble recommending novel items to her in the rock domain. However, it could still be possible to provide her with novel recommendations using collaborative filtering from reggae music. Some quite famous and popular reggae artists may still be novel to her, since her main domain of interest is in rock music. Thus, as illustrated above, popular items still have the potential to be novel recommendations.

Experts and Novices

The proposed algorithm takes information from what we call 'experts' and 'novices' to generate the recommendations. A user is categorized as an 'expert' in the music that resides in his/her head portion of the playlist. At the same time, the same user is a 'novice' in the music that resides in the long tail of his/her playlist. Here, when we refer to playlist, we refer to the one that is sorted by play count with the x-axis being the song items, as in FIG. 1.

The Mystery of Unpopular 'Loved' Songs

Last.fm has a function that enables users to mark a song 'loved'. This explicit feedback from users shows that the user has positive ratings for the marked song. Thus, it seems reasonable to think that songs marked as 'loved' would be high up on the playlist, with the majority of the user's play counts distributed among the loved songs. However, when examined, such 'loved' songs can be found scattered along the playlist. Songs that are marked 'loved' can be found residing in the long tail as well, as shown in FIG. 2.

Here, a paradox is found—songs are marked 'loved', yet they lie in the long tail with the minimal number of play counts. One explanation for this anomaly could be that the user came across some songs that are not usually songs that he/she would be listening to. In other words, these songs were serendipitous findings. But since the user is unfamiliar with the particular genre/artist, it was difficult to find similar songs, and thus, simply marked them 'loved' and continued listening to the original playlist.

The 'loved' function of Last.fm is not a function that is used by a minority of users. Lee et al. studied 21,688 Last.fm users and found that 16,973 users, or 78.3%, used the 'love' function. Among the 78.3% of users that made use of the 'love' function, 77.8% of them had songs that were marked 'loved' in the long tail portion of their playlist [11].

Now that we have defined experts and novices, brought a new perspective in novel recommendations, observed the long-tailed distribution of a users' playlists, and discovered the abnormal existence of 'loved' songs in the tail, we are ready to explain the basic concept of the algorithm.

Figure 3:
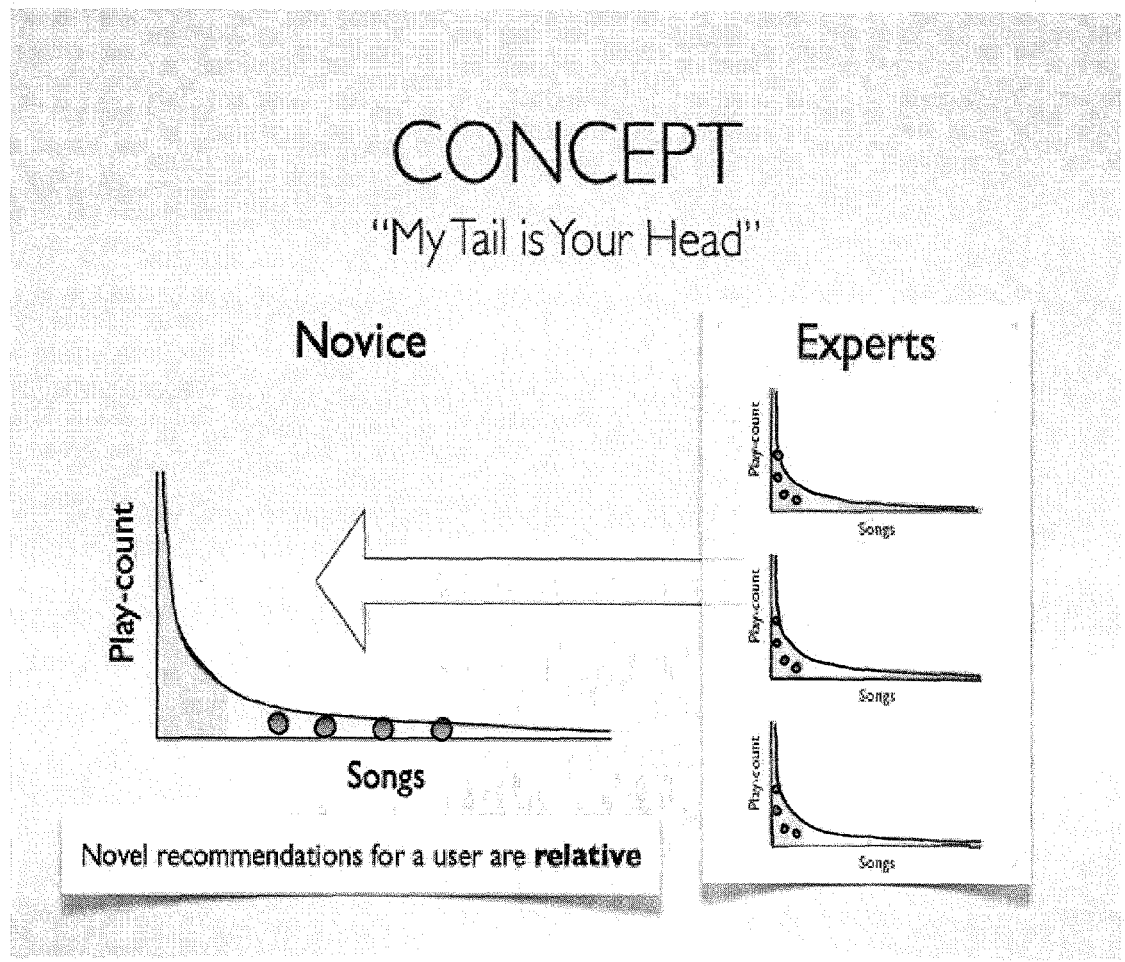
FIG. 3 shows the key concept of the algorithm, which takes advantage of the long-tailed distribution of playlists and divides users into experts and novices to generate recommendations.

The basic concept of the algorithm is illustrated in FIG. 3. The novice is the user who will be receiving the recommendations. These recommendations will be found using only the songs found in the user's long tail part of his/her playlist that are also marked as 'loved'. We then find experts of these songs, i.e. those who own one or more of these songs in the short head portion of their playlists. These experts are then analyzed to find similarities in the songs they have in the short head, which are recommended back to the novice.

The generated recommendations will be relevant to the novice, because the algorithm only uses items that the novice marked 'loved', an explicit and positive feedback from the user, and searches for experts on these items. These experts are then analyzed for similarities in their playlists, to ultimately offer relevant recommendations.

Aside from being relevant, the recommended items are also expected be novel to the novice, because the seed songs came from the long tail of the user's playlist and used to find recommendations from users who listen to the genres/artists of the seed songs heavily. A key difference here is that these recommendations may be novel but not always be lesser-known artists. In fact, they could be popular artists in a particular genre that the novice is simply not knowledgeable in. We state that the novice is not knowledgeable in particular areas of music, i.e. songs that were marked 'loved' but in the long tail, because of the assumption explaining the paradox that we made earlier.

The general idea of the algorithm is to do link analysis within the experts and calculate their relative importances, or weights, that are ultimately applied to the candidate songs. The previous research from Lee [11] used simple weights to measure the priority of songs. Each song's weight was calculated as the number of experts who had that song. Thus, it was impossible to distinguish songs that had the same weights and made it extremely difficult to provide the user with Top N results, due to the lack of an importance measure.

In the invention, we propose an algorithm that enables us to distinguish the priorities of songs by assigning them weights depending on the importances of the experts that own them. We apply a link analysis algorithm, similar to that used by the PageRank algorithm [14]. We assign importance weights to each expert, whose importance is determined by the importances of all the other experts in the set. By doing so, we calculate the relative importance of the experts and then reapply these importance weights back to the songs that they possess. Naturally, songs that belong to Experts with high importance will have a high score. These scores will be the measure in distinguishing the Top N songs for the final recommendations.

However, in order to apply link analysis, the experts need to actually have links between them. Thus, the set of Experts that are gathered for a given query are deliberately manipulated to form a complete graph, with the experts being vertices. For each expert, we create two kinds of 'links', or edges, to all other experts: 1) the first kind of link represents the number of identical songs in both experts' playlists (Expert's playlist refers to the short head portion of the entire user's playlist. Similarly, novice's playlist refers to the long tail portion of the playlist.), and 2) the second kind of link represents the number of identical 'loved' songs in both experts' playlists. Both links are always bidirectional, with the number of items being the weights of the links.

The calculation of the importance of Expert E is given in the equation below, where $Ind(E_j)$ is the independent weight of the expert, $N_{exp}$ is the number of total experts, $RegSongs(E_j, E_i)$ denotes the number of same song occurrences in the playlists of experts $E_i$ and $E_j$, $N_{loved}$ is the total number of 'loved' songs in the novice's long tail (i.e. query size), and $LovedSongs(U_i, U_j)$ denotes the number of 'loved' songs that both experts share.

$$Imp(E_j) = Ind(E_j) + \sum_{i=1}^{N_{exp}} \frac{RegSongs(E_j, E_i) * Imp(E_i)}{N_{loved} + 1 - LovedSongs(E_j, E_i)}, i \neq j$$

Each expert's importance is calculated relatively depending on its relations with other experts. We reward positive relations with other experts if they both have the same songs. We also further reward the relations if they both have matching 'loved' songs. The independent weight of the expert is the basic weight that an expert is assigned to. In the case when an expert does not have any relations with other experts, this independent weight can be the basic influence the expert can have on its songs.

Figure 4:
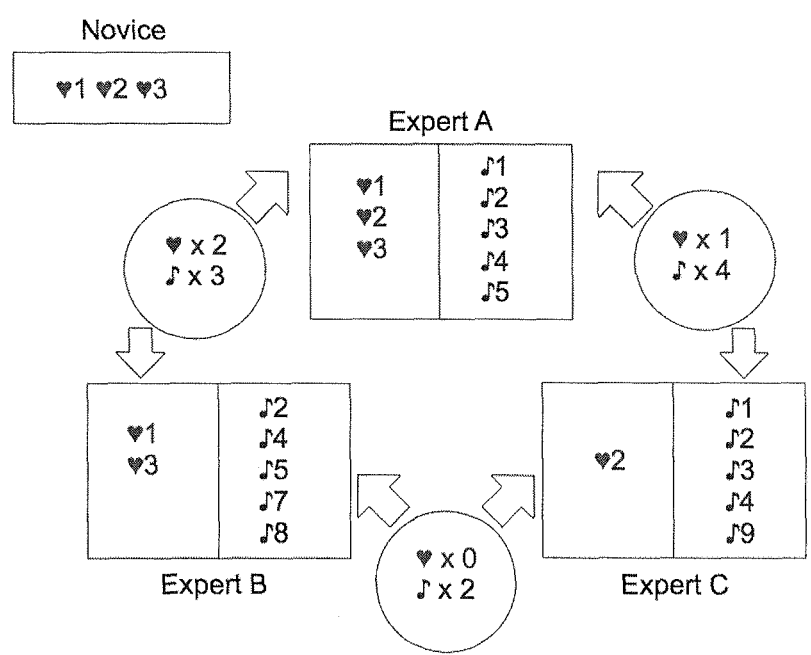
FIG. 4 shows an illustration of how links are applied to users in order to apply link analysis to the algorithm.

This method of creating links between experts and calculating their importances is illustrated using a simple example consisting of a query from a user and three experts in FIG. 4. Each heart represents a 'loved' song by the novice while the musical notes represent the remaining regular songs. The numbers next to them are simply IDs. In this situation, the novice has three 'loved' items in her long tail. For the sake of simplicity, we assume that only three users were found that had one or more of the three 'loved' songs in their short heads. These three users are now considered experts and are analyzed for similarity.

We create two bidirectional links between each Expert, one for each kind of link mentioned beforehand. In this example, Expert A and Expert B have the 'LovedSong' link with Weight 2 because they share two 'loved' songs. They also have the 'RegSong' link with Weight 3 because they have Songs 2, 4, and 5 in common. Here, the importance of Expert A would be:

$$Imp(A) = Ind(A) + \frac{3 * Imp(B)}{3 + 1 - 2} + \frac{4 * Imp(C)}{3 + 1 - 1}$$
$$= Ind(A) + \frac{3 * Imp(B)}{2} + \frac{4 * Imp(C)}{3}$$

Although Expert A and B only share three songs, they are additionally rewarded because they share two 'loved' songs. The final weight of each recommendable candidate song, i.e. the union of the songs of the experts, will be the sum of the weights of its experts.

The pseudocode for the proposed algorithm is shown in Algorithm 1. Because the key idea of calculating expert importance is a recursive one, the calculations were done using an iterative process.

Although not reflected in the pseudo-algorithm, there exists a step in which the final candidate set of recommended songs are compared to the artists residing in the novice's playlist. Artists that the user is already aware of, in other words, if the user already has the artists in his/her playlist then they are discarded from the candidate set. The remaining songs are then sorted again by weight and the top 20 recommendations are given to the user.

The parameters used in the algorithm have great influence over the resulting recommendations, especially the qualification threshold of an Expert. In this study, this threshold was set to 30, meaning that users who had any of the novice's 'loved' songs in the top 30 songs of his/her playlist (sorted by play count) would be considered experts. This is a highly loose threshold for selecting experts—Lee et al. had fixed this value to 5 [11]. Another parameter, one that has relatively less influence over the resulting recommendations, is the independent weight of an expert. In this study, the independent weight was set to the number of 'loved' songs that the expert possessed.

---
Algorithm 1 Pseudocode for recommendation algorithm
---

```
Require: Novice N has loved songs in long tail
    NumLovedSongs numLoved ← numLovedSongsTail(N);
    CandidateSongSet CandSS;
    AllExperts AllExp;
    SongSet S₁ ← getSongsInLongTail(N);
    SongSet S_loved ← filterLovedSongs(S₁);
    for all Song s in s_loved do
        ExpertSet ExpSet ← findExpertsForSong(s);
        AllExp ← AllExp + ExpSet;
        for all Expert e in ExpSet do
            CandSS ← CandSS + getSongsFromHead(e);
        end for
        i ← i + 1
    end for
    Matrix M_loved ← computeLoveSongSimilarity(AllExp);
    Matrix M_songs ← computeSongSimilarity(AllExp);
    for iteration = 1 → 10 do
        weightSum ← 0.0
        for j = 1 → size(AllExp) do
            Expert e ← getExpertFromSet(ExpSet, j);
            e_imp ← getNumberOfLovedSongs(e);
            for i = 1 → else(AllExp) do
                Expert e₂ ← getExpertFromSet(ExpSet, i);
                if i=j then
                    e_imp ← e_imp + M_songs[i][j]*e_2imp/(numLoved +
                    1 - M_songs[i][j]);
                end if
            end for
            e_temp ← e_imp;
            weightSum ← weightSum + e_imp;
        end for
        for all Expert e in ExpSet do
            e_imp ← e_temp/weightSum;
        end for
    end for
    assignExpertWeightsToSongs(ExpSet, CandSS);
```

Data

The data that was used for this study was the same dataset from Lee et al. [11]. Lee created a custom web crawler that gathered data from the Last.fm website between early March and late April, 2010. The data that was gathered were user playlist information, such as user ID, song title, artist name, play count, and whether the track was marked 'loved'. The Last.fm API was not used because it only offered the top 50 items of a user's playlist history (Last.fm API now provides all 500 items.). The Last.fm website makes available the top 500, which is needed in order to utilize the long-tailed distribution.

The data was crawled by getting the playlist information of one user, then retrieving the list of friends of that user, and recursively gathering information. The initial user to be crawled was a random staff member at Last.fm, whose username is available on the website. Using this method, a total of 21,681 users were crawled for their playlist information. The total number of songs for 21,681 playlists was 9,073,681 songs. Among these songs, 2,001,324 songs were unique. The summary of the collected data is shown in Table 1.

TABLE 1

Data used for the study

| Data Type | Count |
|---|---|
| Users | 21,681 |
| Unique Songs | 2,001,324 |
| Songs from all playlists combined | 9,073,681 |

There are numerous methods of evaluating recommender systems, ranging from cross-validation to live user tests. However, the subjectivity of what items are novel to a user drastically reduces the methods that can be used to evaluate algorithms such as the one proposed in the invention. Offline evaluations would not be possible because, by definition, if a truly novel item is provided to a user then the user has no knowledge of the item. Thus, to evaluate on the relevancy of the item, the user has to actually be provided with supplementary information on the item [7]. This makes evaluating novelty and relevancy extremely difficult, in which the only method left is to carry out a live user test and receive explicit input on the novelty and relevancy of the recommended items [17].

A website dedicated for the user study was made available online. Users of Last.fm only needed to input their usernames and would be presented with their recommendations. The page consisted of the user's 'loved' songs at the top and a table of the top 20 recommendations at the bottom of the list of 'loved' songs. The recommendations could be evaluated at the track-level, with each item having an area for user input to indicate (either yes or no) the novelty and the relevancy of the item. To facilitate in evaluating unknown items, each track was linked back to its Last.fm page, where the user could find related information and also listen to the track. A sample page is shown in FIG. 5.

Last.fm users who had 'loved' songs in their long tail were randomly selected via private messages to participate in the user study. This was the most direct channel to gain users for the study, because users had to be Last.fm members. In addition, they needed a long history of listening to music, in order to have a long-tailed playlist. Thus, it was not possible to invite people to join Last.fm and continue the user study immediately.

A total of 139 people were sent private messages, requesting them to participate in a user study that offered them music recommendations. However, only 26 users responded and participated in the live test. Among the 26 users, 14 users did not leave any evaluations of the recommended items, leaving 12 users with evaluated items.

Among the users that did evaluate the individual items, some only checked the relevancy and some only checked the novelty. It was common to see users checking the novelty of an item but leaving the relevancy unchecked. This shows the difficulty in evaluating novel items, in which the user has to actually take a look at the item and listen to it in order to decide the relevancy.

Nonetheless, the results of the user test are summarized in Table 2 and Table 3. Table 2 shows the total number of items that were voted relevant and novel. The total number of answers is not 240 (12 users each evaluating 20 items) because not all users fully evaluated the Top 20 recommendations given to them. Evaluations that were omitted by the user were not considered in the results. The results show that 79% of the recommendations were relevant and 46%, almost half, of the recommendations were novel ones.

Table 3 shows the summarized results from only the users that evaluated all 20 recommendations on both novelty and relevancy. 47.5% of the recommendations were relevant but failed to be novel. We can argue that even the experts themselves were prone to popularity bias, due to the lenient parameter of selecting experts. On the other hand, 30% of the recommendations proved to be both novel and relevant at the same time. This is definitely a substantial number of recommendations that are both novel and relevant, exceeding the sum of items that were novel but failed to be relevant and items that were neither.

TABLE 2

Relevancy and Novelty Votes

|  | Relevancy | Novelty |
| --- | --- | --- |
| Number of YES votes | 179 | 84 |
| Total number of responses | 226 | 182 |
| % | 79% | 46% |

TABLE 3

Results of Full Answers

|  | R but !N | ! R but N | R & N | ! R & !N |
| --- | --- | --- | --- | --- |
| # of votes | 76 | 22 | 48 | 15 |
| Total # of votes | 160 | 160 | 160 | 160 |
| % | 47.5% | 13.75% | 30% | 9.3% |

Because the parameter for choosing experts was chosen to be lenient in the experiment, the generated recommendations were generally popular artists. However, our definition of a novel recommendation allows the recommendations of popular artists as they still may be novel to a user who is not familiar in that musical domain. Indeed, despite the popular artists being recommended, almost half of the items were rated as being novel to the users. 30% of the recommendations were even relevant and novel.

For the same reason as stated above, the leniency of the requirements of being an expert also did some harm to the results. 47.5% of the recommendations were rated relevant but not novel. This was the problem that the algorithm intended to tackle in the first place: the popularity bias. Here, we safely assume that the pool of songs used for each expert was so large that the extremely popular items scored high and thus, the intended recommendation items were not reflected in the final list. This could be solved by making the requirement of qualifying as an expert more demanding. This would lead to a smaller pool of songs being compared, lessening the chance of irrelevant popular items gaining scores and ending up on the final recommendation list.

In this study, we propose an innovative approach in recommending novel yet relevant songs to users by using their long-tailed playlists. We also tackle the problem of popularity bias that is apparent in collaborative filtering, by still retaining collaborative filtering. Users were divided into experts and novices according to their long-tail distribution in their playlists. These experts were then converted to nodes with bidirectional links connecting all the experts to one another. These links were created to perform link analysis on the graph and ultimately assign fine-grained weights to songs.

We brought a different perspective to what novel recommendations could be in the domain of music. Users could be knowledgeable in one area (genre, culture, country, etc) of music but be a novice in other areas. In this sense, popular artists could still be novel to a user who is a novice in that area.

Through a live user test, we provided random Last.fm users recommendations generated by this algorithm. Results showed that this algorithm was able to generate novel recommendations and keep them relevant. The portion of novel items among the total recommendations was 46%, almost half of the recommendations. 30% of the recommendations were successfully novel and relevant. These results show that the proposed method of utilizing long-tailed distributions found in playlists has the potential of generating quality novel recommendations, using the correct parameters. It also shows that, by applying link analysis, the recommended songs could be distinguished in greater detail, enabling a limited list of top N songs.

Figure 6:
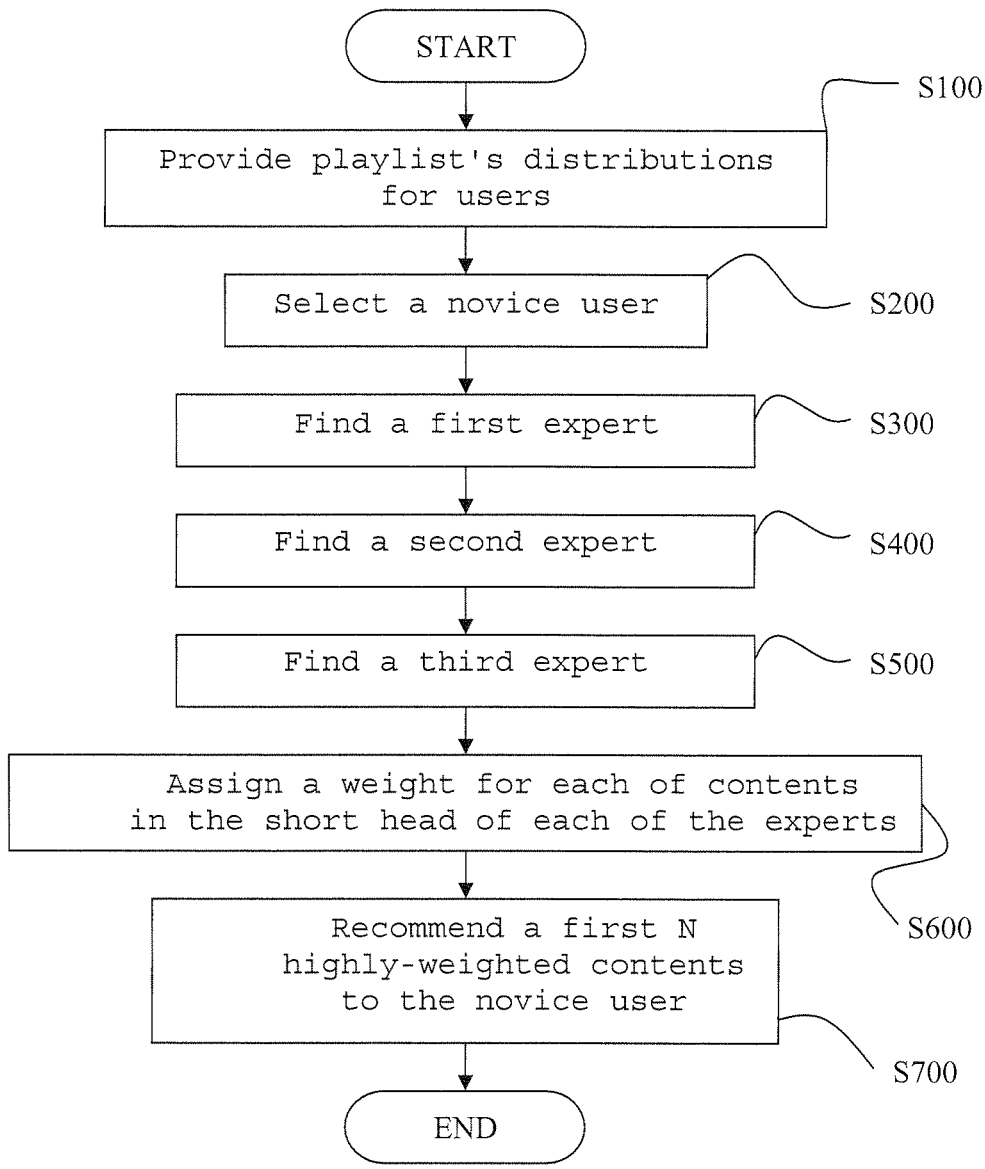
FIG. 6 is a flowchart showing a method of contents recommendation according to an embodiment of the invention.

According another aspect of the invention as shown in FIG. 6, an aspect of the invention provides a method for contents recommendation comprising steps for:

providing a plurality of playlist's distributions associated with a plurality of users respectively (S100);

selecting a novice user from the plurality of users, wherein the novice user has one or more novice-loved-contents in a long tail of an associated playlist's distribution as a novice-playlist's distribution (S200);

finding a first expert user with an associated playlist's distribution as a first-expert-playlist's distribution, wherein a short head of the first-expert-playlist's distribution includes at least one of the novice-loved-contents (S300);

finding a second expert user with an associated playlist's distribution as a second-expert-playlist's distribution, wherein a short head of the second-expert-playlist's distribution includes at least one of the novice-loved-contents (S400);

finding a third expert user with an associated playlist's distribution as a third-expert-playlist's distribution, wherein a short head of the third-expert-playlist's distribution includes at least one of the novice-loved-contents (S500);

assigning a weight for each of contents in the short head of each of the experts, wherein the weight depends on a sum of importances of the experts for the specific contents, wherein an importance of an expert is determined by a number of identical contents between the expert's playlist and each of the other expert's playlist and a number of identical loved-contents between the expert's playlist and each of the other expert's playlist (S600); and recommending a first N highly-weighted contents to the novice user (S700).

A playlist distribution may include contents's information, play counts, and preference tags.

Each of the loved-contents may be selected and marked 'a loved-contents' in the preference tag by corresponding user, and the other contents in a playlist may be marked 'regular-contents'.

The playlist's distributions may be associated with a threshold number, top-count contents of which dividing the short head from the long tail of distribution.

The method may further comprise a step for discarding a recommended contents if an artist of the recommended contents is already known in the playlist of the novice.

The contents may be songs, and the importance of an expert, $E_j$, may be given by $$Imp(E_j) = Ind(E_j) + \sum_{i=1}^{N_{exp}} \frac{RegSongs(E_j, E_i) * Imp(E_i)}{N_{loved} + 1 - LovedSongs(E_j, E_i)}, i \neq j,$$

where $Ind(E_j)$ is the independent weight of the expert, $N_{exp}$ is the number of total experts, $RegSongs(E_j, E_i)$ denotes the number of same song occurrences in the playlists of experts $E_i$ and $E_j$, $N_{loved}$ is the total number of 'loved' songs in the novice's long tail, and $LovedSongs(U_j, U_i)$ denotes the number of 'loved' songs that both experts share.

The independent weight, $Ind(E_j)$, may be a basic weight that an expert is assigned to.

The independent weight may be set to a number of 'loved' songs that the expert possessed.

In the step for assigning a weight (S600), the short head portion may be used for the expert's playlist and the long tail portion may be used for the novice's playlist.

The step of assigning a weight (S600) may comprise a step for assigning a high score to a contents that belongs to an expert with a high importance.

Each of the plurality of playlist's distributions may be sorted by play count defining play count distribution as a function of song index.

The contents may comprise songs, movies, books, and on-line shopping items.

The threshold number may be determined by the number of entire users.

The threshold number may comprise 5, 10, 20, 30, 40, 50, 100, 200, 400, 800, and 1600.

In certain embodiments of the invention, the method may further comprise a step for finding more than the three experts from the users, each with an associated playlist's distribution as an specific expert-playlist's distribution, wherein a short head of the specific expert-playlist's distribution includes at least one of the novice-loved-contents. The more users, then the more experts may be.

While the invention has been shown and described with reference to different embodiments thereof, it will be appreciated by those skilled in the art that variations in form, detail, compositions and operation may be made without departing from the spirit and scope of the invention as defined by the accompanying claims.

REFERENCES

[1] C. Anderson. The Long Tail: Why the Future of Business Is Selling Less of More. Hyperion, 2006.
[2] E. Brynjolfsson, Y. J. Hu, and D. Simester. Goodbye pareto principle, hello long tail: The effect of search costs on the concentration of product sales. Technical report, Massachusetts Institute of Technology (MIT)—Sloan School of Management; National Bureau of Economic Research (NEER), Purdue University—Krannert School of Management, MIT Sloan School of Management, 2007.
[3] O. Celma. Foafing the music: Bridging the semantic gap in music recommendation. In Proceedings of the 5th International Semantic Web Conference, pages 927-934. Springer, 2006.
[4] O. Celma and P. Lamere. If you like the beatles you might like . . . : a tutorial on music recommendation. In A. El-Saddik, S. Vuong, C. Griwodz, A. D. Bimbo, K. S. Candan, and A. Jaimes, editors, ACM Multimedia, pages 1157-1158. ACM, 2008.
[5] Y.-C. Chen, R.-A. Shang, and C.-Y. Kao. The effects of information overload on consumers' subjective state towards buying decision in the internet shopping environment. Electron. Commer. Rec. Appl., 8:48-58, January 2009.
[6] D. Goldberg, D. Nichols, B. M. Oki, and D. Terry. Using collaborative filtering to weave an information tapestry. Commun. ACM, 35(12):61-70, 1992.
[7] J. L. Herlocker, J. A. Konstan, and J. T. Riedl. Evaluating collaborative filtering recommendations. In Computer Supported Cooperative Work, pages 241-250, 2000.
[8] W. Hill, L. Stead, M. Rosenstein, and G. Furnas. Recommending and evaluating choices in a virtual community of use In CHI '95: Proceedings of the SIGCHI conference on Human factors in computing systems, pages 194-201, New York, N.Y., USA, 1995.
[9] Z. Huang, D. Zeng, and H. Chen. A link analysis approach to recommendation under sparse data. In Proceedings of the Tenth Americas Conference on Information Systems, New York, N.Y., USA, 2004.
[10] J. A. Konstan, B. N. Miller, D. Maltz, J. L. Herlocker, L. R. Gordon, and J. Riedl. GroupLens: applying collaborative filtering to Usenet news. Communications of the ACM, 40(3):77-87, 1997.
[11] K. Lee, W. S. Yeo, and K. Lee. Music recommendation in the personal long tail: Using a social-based analysis of a user's long-tailed listening behavior. In Proceedings of the Workshop on Music Recommendation and Discovery, pages 47-54, 2010.
[12] M. Levy and M. Sandler. A semantic space for music derived from social tags. In Proceedings of the 8th International Conference on Music Information Retrieval, Vienna, Austria, 2007.
[13] G. Linden, B. Smith, and J. York. Amazon.com recommendations: Item-to-item collaborative filtering. IEEE Internet Computing, 7(1):76-80, January 2003.
[14] L. Page, S. Brin, R. Motwani, and T. Winograd. The pagerank citation ranking: Bringing order to the web. Technical Report 1999-66, Stanford InfoLab, November 1999. Previous number=SIDL-WP-1999-0120.
[15] P. Resnick, N. Iacovou, M. Suchak, P. Bergstrom, and J. Riedl. Grouplens: An open architecture for collaborative filtering of netnews. In Proceedings of ACM 1994 Conference on Computer Supported Cooperative Work, pages 175-186. ACM Press, 1994.
[16] B. M. Sarwar, G. Karypis, J. A. Konstan, and J. Riedl. Analysis of recommendation algorithms for e-commerce. In Proceedings of the Second ACM Conference on Electronic Commerce (EC'00), pages 285-295, 2000.
[17] J. B. Schafer, D. Frankowski, J. Herlocker, and S. Sen. Collaborative filtering recommender systems, 2007.
[18] U. Shardanand and P. Maes. Social information filtering: algorithms for automating "word of mouth". In CHI '95: Proceedings of the SIGCHI conference on Human factors in computing systems, pages 210-217, New York, N.Y., USA, 1995. ACM Press/Addison-Wesley Publishing Co.

What is claimed is:

1. A method for contents recommendation in an online contents store comprising steps for:
providing a plurality of playlist's distributions associated with a plurality of users of the online contents store on an Internet respectively;
selecting a novice user from the plurality of users, wherein the novice user has one or more novice-loved-contents in a long tail of an associated playlist's distribution as a novice-playlist's distribution;

finding a first expert user with an associated playlist's distribution as a first-expert-playlist's distribution, wherein a short head of the first-expert-playlist's distribution includes at least one of the novice-loved-contents;

finding a second expert user with an associated playlist's distribution as a second-expert-playlist's distribution, wherein a short head of the second-expert-playlist's distribution includes at least one of the novice-loved-contents;

finding a third expert user with an associated playlist's distribution as a third-expert-playlist's distribution, wherein a short head of the third-expert-playlist's distribution includes at least one of the novice-loved-contents;

assigning a weight for each of contents in the short head of each of the experts, wherein the weight depends on a sum of importances of the experts for the specific contents, wherein an importance of an expert is determined by a number of identical contents between the expert's playlist and each of the other expert's playlist and a number of identical loved-contents between the expert's playlist and each of the other expert's playlist; and recommending a first N highly-weighted contents to the novice user through the online contents store on the Internet, wherein the contents are songs, and wherein the importance of an exert, $E_i$, is given by $$Imp(E_j) = Ind(E_j) + \sum_{i=1}^{N_{exp}} \frac{RegSongs(E_j, E_i) * Imp(E_i)}{N_{loved} + 1 - LovedSongs(E_j, E_i)}, i \neq j,$$

where Ind ($E_j$) is the independent weight of the expert, $N_{exp}$ is the number of total experts, Imp ($E_i$) is the importance of Expert $E_i$, and, Imp ($E_i$), i=1 to $N_{exp}$, are calculated recursively, RegSongs ($E_j$, $E_i$) denotes the number of same song occurrences in the playlists of experts $E_i$ and $E_j$, $N_{loved}$ is the total number of 'loved' songs in the novice's long tail, and LovedSongs ($E_j$, $E_i$) denotes the number of 'loved' songs that both experts share.

2. The method of claim 1, wherein a playlist distribution includes contents' information, play counts, and preference tags.

3. The method of claim 2, wherein each of the loved-contents is selected and marked 'a loved-contents' in the preference tag by corresponding user, and wherein the other contents in a playlist are marked 'regular-contents'.

4. The method of claim 1, wherein the playlist's distributions are associated with a threshold number, top-count contents of which dividing the short head from the long tail of distribution.

5. The method of claim 4, wherein the threshold number is determined by the number of entire users.

6. The method of claim 5, wherein the threshold number comprises 5, 10, 20, 30, 40, 50, 100, 200, 400, 800, and 1600.

7. The method of claim 1, further comprising a step for discarding a recommended contents if an artist of the recommended contents is already known in the playlist of the novice.

8. The method of claim 1, wherein the independent weight, Ind($E_j$), is a basic weight that an expert is assigned to.

9. The method of claim 8, wherein the independent weight is set to a number of 'loved' songs that the expert possessed.

10. The method of claim 1, wherein in the step for assigning a weight the short head portion is used for the expert's playlist and the long tail portion is used for the novice's playlist.

11. The method of claim 1, wherein the step of assigning a weight comprises a step for assigning a high score to a contents that belongs to an expert with a high importance.

12. The method of claim 1, wherein each of the plurality of playlist's distributions is sorted by play count defining play count distribution as a function of song index.

13. The method of claim 1, further comprising a step for finding more than the three experts from the users, each with an associated playlist's distribution as an specific expert-playlist's distribution, wherein a short head of the specific expert-playlist's distribution includes at least one of the novice-loved-contents.

* * * * *